UNITED STATES PATENT OFFICE.

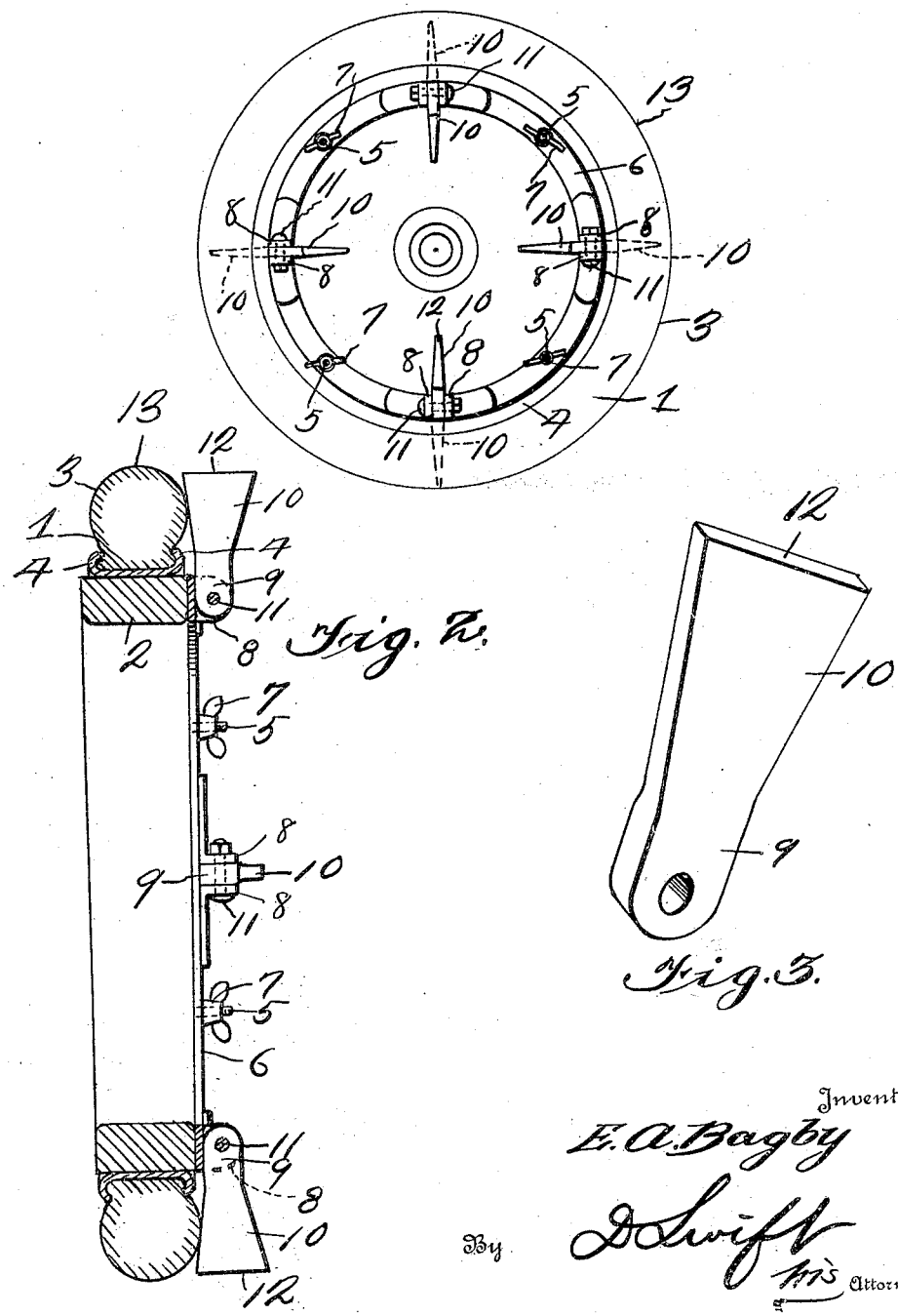

EDWARD ACHALEES BAGBY, OF COUCHWOOD, LOUISIANA.

AUTOMOBILE WHEEL ATTACHMENT.

1,410,871.  Specification of Letters Patent.  Patented Mar. 28, 1922.

Application filed July 20, 1921. Serial No. 486,197.

*To all whom it may concern:*

Be it known that I, EDWARD A. BAGBY, a citizen of the United States, residing at Couchwood, in the parish of Webster, State of Louisiana, have invented a new and useful Automobile Wheel Attachment; and I do hereby declare the following to be a full, clear, and exact description of the invention, such as will enable others skilled in the art to which it appertains to make and use the same.

The invention relates to attachments for rear wheels of automobiles, and has for its object to provide a device of this character comprising an annular member adapted to be secured to the side of the wheel felly and provided with a plurality of ground engaging elements pivoted between lugs of the annular member, and forming means for biting into the ground and prevent slipping of the wheel when the same is going through mud or soft ground.

A further object is to pivot ground engaging elements between spaced lugs carried by the annular member, and to provide bolts extending through said spaced lugs and through the ground engaging elements, said bolts forming means for holding the ground engaging elements in extended or folded positions.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a side elevation of a conventional form of automobile wheel showing the device applied thereto.

Figure 2 is a vertical sectional view through an automobile wheel showing the device applied thereto and in section, with the ground elements in extended positions.

Figure 3 is a perspective view of one of the ground engaging elements.

Referring to the drawings, the numeral 1 designates a conventional form of automobile wheel and 2 the felly thereof, on which felly the conventional form of tire 3 is disposed and held in the usual manner by means of clincher flanges 4. Extending outwardly from the felly 2 at points spaced from each other are bolts 5, which bolts extend through apertures in an annular member 6 and are provided with nuts 7, by means of which nuts the annular member 6 is held in place on the wheel felly 2. The annular member 6 at points spaced from each other is provided with spaced ears, between which ears the ends 9 of ground engaging elements 10 are pivoted on bolts 11. Bolts 11 pass through the ears 8 and not only form a pivotal point on which the ground engaging elements pivot but also form means whereby the ground engaging elements may be securely clamped between the ears 8 for holding the same in extended position as shown in dotted lines in Figure 1 or in full lines in Figure 2 or in an inward folded position as shown in full lines in Figure 1. When the wheel is going through mud or over extremely bad roads, the operator extends the ground engaging elements 11 so that they will bite into ground or mud and prevent spinning of the drive wheel or wheels as two of the devices are preferably used, that is one on each drive wheel of the automobile. The ground engaging elements 10 have their ends 12 terminating adjacent the tread 13 of the tire, and are transversely disposed, thereby gripping the mud or dirt at a right angle to the direction of rotation of the wheel and securing the maximum holding of the dirt by the ground engaging elements. On good roads, the device as a whole may if so desired be removed from the wheel, or the ground engaging elements 11 folded inwardly to the full line positions shown in Figure 1, however this may be optional with the operator, and means is provided whereby the ground engaging elements may be folded inwardly and held in inward position without removing the device from the wheel.

From the above it will be seen that an anti-skidding and spinning device is provided for automobile wheels which device is simple in construction and one wherein the parts have been reduced to a minimum thereby allowing the same to be cheaply manufactured.

The invention having been set forth what is claimed as new and useful is:—

The combination with an automobile wheel having a felly and a tire carried by said felly, of an anti-spinning device for said wheel, said device comprising an annular member detachably secured to said felly, a plurality of spaced ears carried by said annular member, ground engaging elements having one of their ends pivoted between said ears on bolts extending through said ears, said ground engaging elements being radially disposed, said bolts forming means whereby said ground engaging elements may be securely held in outward operative position or in inward inoperative position.

In testimony whereof I have signed my name to this specification in the presence of two subscribing witnesses.

EDWARD ACHALEES BAGBY.

Witnesses:
J. F. FOLEY,
H. S. SPAIN.